United States Patent [19]
Guttman et al.

[11] Patent Number: 5,949,534
[45] Date of Patent: Sep. 7, 1999

[54] GONIOMETRIC SCANNING RADIOMETER

[75] Inventors: Jeffrey L. Guttman, Los Gatos; John M. Fleischer; Simon E. Saba, both of San Jose, all of Calif.

[73] Assignee: Photon, Inc., Santa Clara, Calif.

[21] Appl. No.: 09/012,830

[22] Filed: Jan. 23, 1998

[51] Int. Cl.$^6$ .................................................. G01J 1/04
[52] U.S. Cl. .......................................................... 356/121
[58] Field of Search .................................... 356/121, 225, 356/226

[56] References Cited

U.S. PATENT DOCUMENTS

| | | |
|---|---|---|
| 3,999,864 | 12/1976 | Mutter . |
| 4,171,911 | 10/1979 | Aberle et al. . |
| 4,285,597 | 8/1981 | Lamprecht et al. . |
| 4,344,709 | 8/1982 | Provder et al. . |
| 5,253,036 | 10/1993 | Ashdown . |
| 5,514,867 | 5/1996 | Beyer et al. ............................ 356/123 |

*Primary Examiner*—F. L. Evans
*Attorney, Agent, or Firm*—Feix & Feix

[57] ABSTRACT

A gonioradiometric scanning apparatus and method for measuring the near and/or far field radiation pattern of radiating optical sources such as laser diodes (LD), light emitting diodes (LED), optical fibers, flat panel displays, and luminaires is described. The scanning apparatus incorporates a deflector for selecting an azimuth angle through the optical source to be measured, a rotating apparatus which collects light while scanning about the source, an optical commutator, and a detector. The rotating apparatus comprises a cylindrical hub and an optical collector using either an optical fiber or a train of reflectors, such as mirrors or retro-reflectors. The optical collector provides a means for both collecting light and for directing the beam emanating from the deflector to a place opposite the detector at which optical commutation occurs. The reflector optical train, when employed, folds the optical path and increases the effective radius of measurement, so that large radius scans can be obtained in an instrument with compact geometry. Depending on the source geometry and the effective optical path, the light collection can be either in the near field or the far field of the source radiation pattern. For the case of the far field radiation pattern, it will also be possible to measure the near field radiation patterns by imaging the source onto the light collection surface.

28 Claims, 4 Drawing Sheets

$$r(\theta') = \sqrt{R^2 + d^2 + 2Rd\cos\theta'}$$

GONIOMETRIC SCANNING RADIOMETER

TECHNICAL FIELD

The present invention relates to a gonioradiometric scanning apparatus and/or method for measuring the near or far field radiation pattern of optical sources such as laser diodes (LD), light emitting diodes (LED), optical fibers, flat panel displays, and luminaires.

BACKGROUND OF THE INVENTION

Techniques are known in the art for measuring or characterizing the radiation pattern of optical sources utilize a goniometer in combination with an optical detector. These "gonioradiometric" measurements are typically made by rotating the detector on a radial arm of the goniometer about the optical source (light source) to be measured. The detector scans though angles and measures light output as a function of angle. In accordance with another known technique, a light source is mounted to a rotating goniometer which scans the optical beam from the light source across a detector that is fixed at one position. The mechanical scanning apparatus associated with the above-described known techniques often occupy a rather large volume due to the necessity of scanning at specified radii, on the order of many meters in some cases. In addition, the mechanical scanning apparatus is typically large and cumbersome and thus does not allow for rapid positioning. This results in lengthy scan times. In some cases the scan times can be on the order of several minutes or more per individual scan. This translates to characterization times on the order of hours for a full incremental scan of the radiation pattern of a source.

Accordingly, a gonioradiometric scanning apparatus and technique which overcome the above-noted limitations of the prior art gonioradiometric scanning systems would constitute a significant advance in the art.

SUMMARY OF THE INVENTION

It is among the objectives of the present invention to provide a gonioradiometric scanning apparatus that overcomes the limitations of the prior art.

It is another object that basic design of the apparatus be scalable, up or down as appropriate, for making measurements of the far field radiation pattern of laser diodes and the near and/or far field radiation patterns of various other kinds of compact point source light sources, such as light emitting diodes, optical fibers, flat panel displays, and luminaires.

It is another object of the invention to provide a compact gonioradiometric scanning apparatus that is of low cost and simple construction.

The objects of the present invention are achieved by a gonioradiometric scanning apparatus that uses radiation deflectors (e.g., mirrors) and a scanning mechanism to scan through the different angles of the source radiation pattern and deliver the scanned radiation signal to a stationary detector. In the present invention, both the source radiation being measured and the detector are kept stationary.

In accordance with a specific application of the invention, the radiating source to be measured is an optical radiating source (i.e., electromagnetic radiation within the ultra violet, visible light, near infra red and infra red spectra). The principle components of the apparatus for measuring the optical source comprise a radiation deflector in the form of an entrance aperture mirror, a collector, a commutator and a detector. The entrance aperture mirror deflects light from the optical source to the collector which is mounted to a cylindrical hub that is caused to rotate about the center axis of the optical source. The collector has an exit end arranged in co-alignment with the axis of rotation of the rotating hub and is separated from the detector by a small air gap. This arrangement forms the optical commutator. The entrance aperture mirror effectively selects a slice through the radiation pattern of the optical source being measured and the rotating collector scans through the light reflected by the entrance aperture mirror and delivers it to the detector by means of the commutator.

The entrance aperture mirror is also rotatable about the center axis of the optical source being measure. A step wise rotation of the entrance aperture mirror through 180° is effective to characterize the entire radiation pattern of the optical source.

In one embodiment of the present invention, the collector comprises an optical light fiber. In another embodiment of the invention, the collector comprises a train of reflectors mounted in diametrically opposed fashion inside the rotating cylinder. The reflectors fold the optical path of the reflected light and thus increase the effective radius of measurement so that large radius scans can be obtained in a measuring instrument of compact geometry with dimensions on the order of tenths of meters.

The simple and compact geometry of the invention advantageously facilitates rapid scan rates which can provide a full incremental source characterization in times on the order of one minute.

The principle components of the radiation measuring device of the present invention (i.e., the deflector, collector, commutator and detector) may be modified as necessary for measuring and characterizing the radiation pattern of other types of electromagnetic radiation including, but not limited to, radiowaves, microwaves, and x-rays.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

The specific embodiments described below are adapted for measuring the radiation pattern of an optical radiation source. Examples of the kinds of radiation sources to be measured include optical sources of the kind that emit radiation in the ultra violet, visible light, near infra red and infra red spectra, including but not limited to, laser diodes (LD), light emitting diodes (LED), optical fibers, flat panel displays, and luminaires. It is understood, however, that the invention can be adapted to measure and characterize the radiation pattern of other types of electromagnetic radiation, including but not limited to, radiowaves, microwaves, and x-rays.

Figure 1:
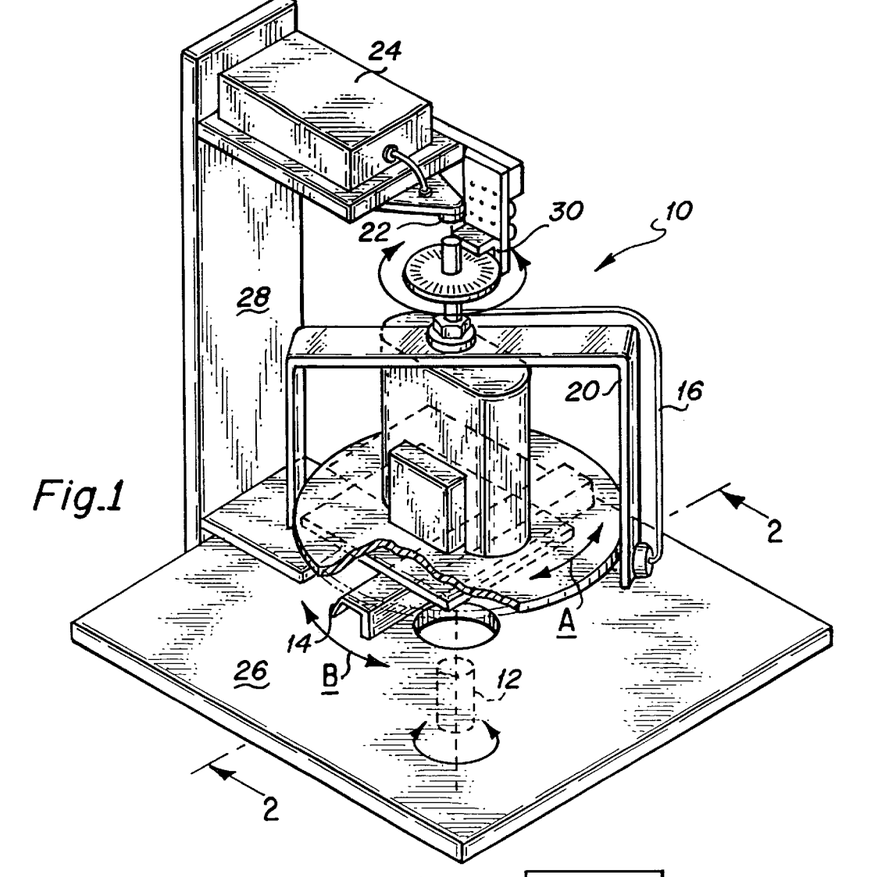
FIG. 1 is an isometric perspective view of a goniometric scanning radiometer constructed in accordance with a first embodiment of the present invention.
Figure 2:
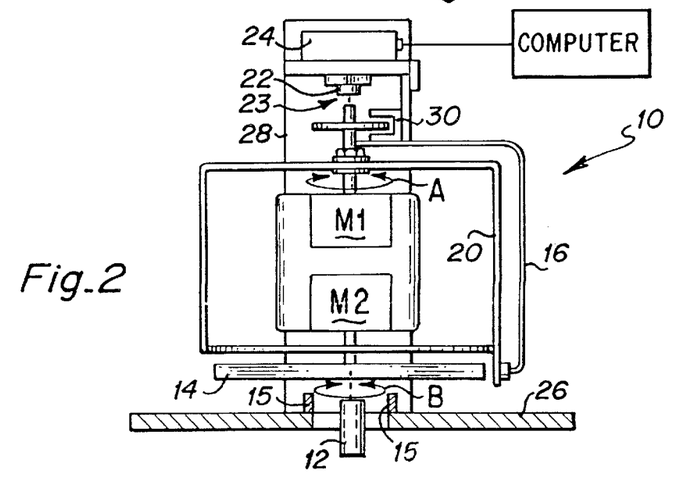
FIG. 2 is a side elevation view in partial cross section of the embodiment shown in FIG. 1 taken along the line and in the direction of arrows 2—2.

Referring now to FIGS. 1 and 2, there is illustrated a scanning radiometer 10 constructed in accordance with a first embodiment of the present invention.

The scanning radiometer 10 includes radiation deflector means for deflecting radiation from radiating optical source 12 at 90°. Depending on the type of radiation source being measured, the radiation deflector means may include mirrors or diffraction gratings (suitable for optical radiating sources as defined above) or crystals or multi-layer mirrors (suitable for scattering x-ray sources). In the preferred embodiment, the deflector means is in the form of a mirror, herein referred to as the "entrance aperture" mirror. The scanning radiometer 10 further includes radiation collection means for collecting the radiant energy (in this case, light) reflected from entrance aperture mirror 14. In the preferred embodiment, the radiation collection means comprises collection optics in the form of an optical light fiber 16. A suitable light baffle 15 may be used to block the direct path between the optical source 12 and the collection optics 16, so that only light reflected from the entrance aperture mirror 14 is collected by the lower or entrance end of the optical light fiber 16.

The optical light fiber 16 is mounted to rotatable hub 20. A first motor M1 rotates the hub 20 and optical light fiber 16 about the central axis of the optical source 12 as indicated by directional arrow A—A. This rotation enables the optical light fiber 16 to scan through the optical beam reflected by the entrance aperture mirror 14 and collect light energy emanating in multiple directions from the optical source 12. The motor M1 may be operated in a continuous fashion or in a sequential or step-wise fashion as desired.

A second motor M2, preferably a stepper motor or servo motor, rotates the entrance aperture mirror in incremental steps about the central axis of the optical source 12 as indicated by directional arrows B—B.

Motors M1 and M2 are supported on stationary platform 26. Both the optical source 12 and detector 22 are stationary. Detector 22 is mounted on an extension of the upright support member 28.

The upper or exit end of optical fiber 16 is positioned so that it is coaxial with the rotation axis of the cylindrical hub 20. The optical signal at the exit end of the optical light fiber 16 is incident on detector 22. A small air gap separates the exit end of the optical light fiber 16 from the detector 22. This arrangement forms the optical commutator 23 (see FIG. 2). The optical commutator 23 defines the means for transmitting over a single channel the samplings of the light emanating in multiple directions from the optical source 12 collected by the rotating optical collector to the stationary detector. The detector 22 converts the incident optical signal to an electric signal by the detector electronics 24. In functional terms, the "optical commutator", as defined herein, is somewhat analogous to an electrical commutator which is defined as the part of a direct-current motor or generator which, in combination with brushes, provides an electrical connection between the rotating armature winding and the stationary terminals, whereby "bidirectional" AC signals are converted or rectified into a unidirectional or DC signal. Conventional electrical commutator structure may be used in place of the optical commutator if desired for measurement of other types (i.e., non visible light) of electromagnetic radiation sources.

Encoder signals from the entrance aperture mirror stepper motor M2 and the angular position encoder 30 of the rotating cylindrical hub 20 are compared to ensure registration between the two motors M1 and M2.

The orientation of the entrance aperture mirror 14 with respect to source 12 determines the azimuth angle for the scan measurement. For each azimuth angular position of the entrance aperture mirror 12, the rotating collection optics 16 measures the angular dependent energy distribution from the source beam at the present azimuth angle. Rotating the entrance aperture mirror 14 through a series of angles in the range from 0°–180° facilitates the measurement of the complete radiation pattern of the source 12. The total scan angle for a given azimuth angle is a function of the distance between the source 12 and the entrance aperture mirror 14, and by the extent (length) of the entrance aperture mirror 14. Scan angle ranges of greater than 175° (±87.5°) are easily achieved by the present invention. In this embodiment, the effective radius of the scan is equal to the distance between the optical light fiber 16 and the source 12 as reflected from mirror 14.

Figure 3:
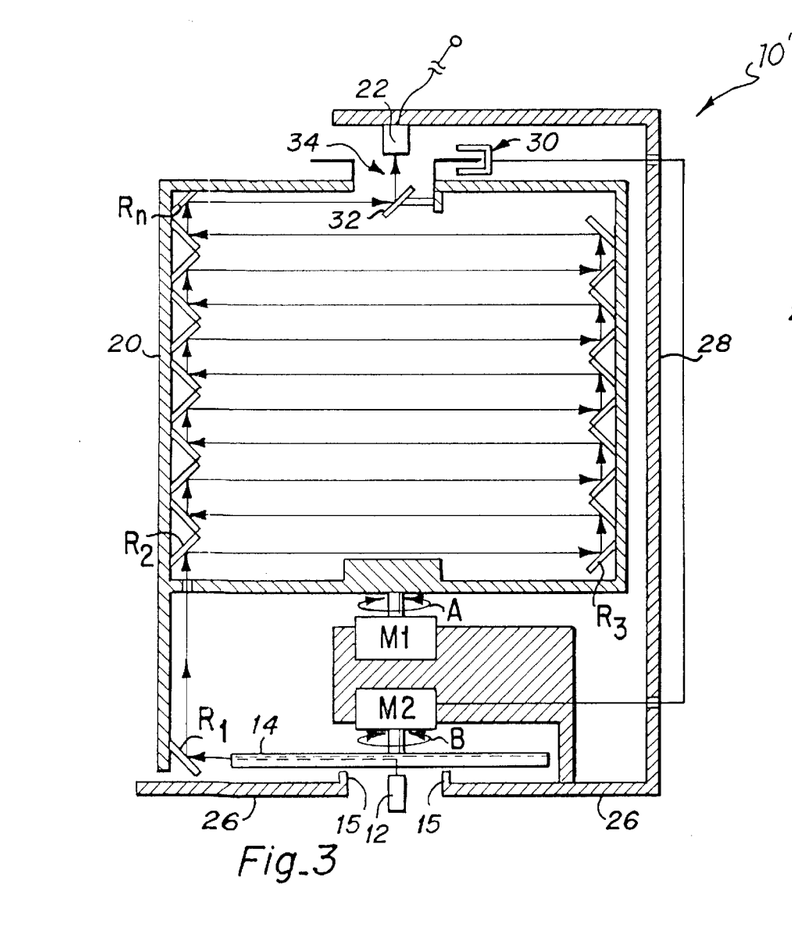
FIG. 3 is a side elevation view in cross section of a goniometric scanning radiometer constructed in accordance with a second embodiment of the present invention.
Figure 4:
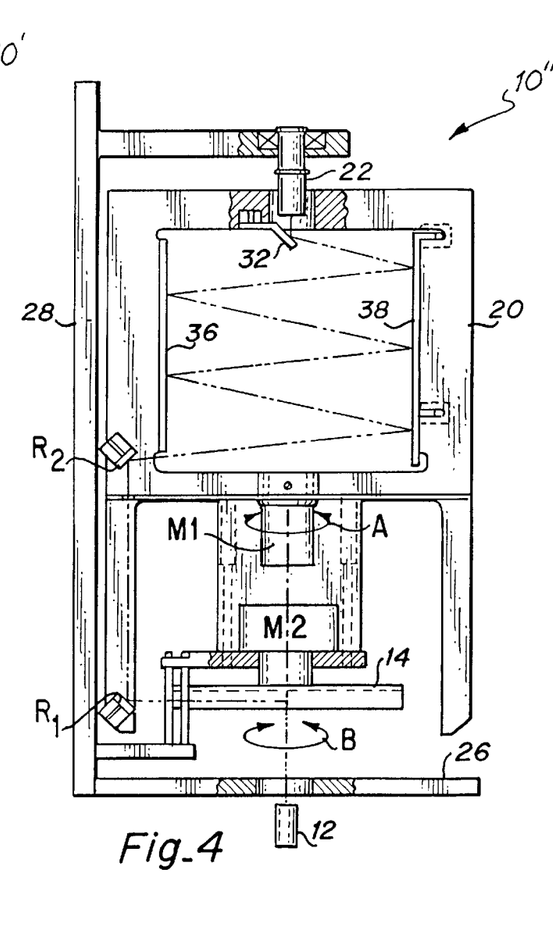
FIG. 4 is a side elevation view in partial cross section of a goniometric scanning radiometer constructed in accordance with a third embodiment of the present invention.

FIGS. 3 and 4 illustrate scanning radiometers 10' and 10" constructed in accordance with alternate embodiments of the present invention. In each of the scanning radiometers 10' and 10" of FIGS. 3 and 4, the light collection means comprise an arrangement of mirrors in place of the optical light fiber 16 of the embodiment described in FIGS. 1–2. For purposes of clarity and brevity in the description, structural components common to all embodiments shown in FIGS. 1–4 and 7 are indicated by identical reference numerals.

As shown in FIG. 3, the optical collector includes a train of reflectors $R_1$–$R_n$ mounted internally to the rotating cylindrical hub 20. As before, a light baffle 15 blocks the direct path between the optical source 12 and the collection optics, so that only light reflected from the entrance aperture mirror 14 is collected. The cylindrical hub 20 rotates about the entrance aperture mirror 14 and scans through the optical beam deflected by the entrance aperture mirror 14. In this embodiment, the reflectors, $R_1$–$R_n$ are mounted diametrically opposed in such a way that the light is directed back and forth across the cylindrical hub 20 from the bottom end to the top end. Reflector $R_1$ reflects the beam to $R_2$, $R_2$ reflects the beam to $R_3$, and so on. Finally, reflector $R_n$ reflects the light to the final reflector in the optical train, referred to herein as the "exit" mirror 32. The reflected beam from exit mirror 32 is coaxial with the rotation axis of the cylindrical hub 20, and is then incident upon the detector 22 positioned above the rotating cylindrical hub 20, once again forming an optical commutator 34.

In this mirror train embodiment, the effective radius of the scan is equal to the distance traversed by the light as it reflects from the series of mirrors. Thus, the effective radius of the scan can be much larger than the overall dimensions of the scanning apparatus when mirrors are used. For example, with 10 mirrors and a cylindrical hub diameter of 10 cm, the scan radius is greater than 1 meter. This distance can be made arbitrarily larger by adding more mirrors, with the practical limit determined by source, position, source intensity, detector sensitivity, and detector bandwidth.

FIG. 4 illustrates a simplified variation on the mirror train embodiment of FIG. 3 wherein single flat mirrors 36 and 38 are substituted in place of plural reflectors $R_3$–$R_n$.

It is understood that the specific embodiments shown and described in FIGS. 1–4 are capable of variation and modification without departure from the true spirit and scope of the present invention. As an example, one variation might be to position the motor drives M1 and M2 for the scan hub and entrance aperture mirror, respectively, off axis from the central vertical axis of the optical source 12. The motor drives M1 and M2 could be positioned outside the scan radius and thereby advantageously eliminate the potential for blind spots in the scan region. Suitable mechanical drive and linkage systems (e.g., pulley or belt drives, gear drives, etc.) may be used to transfer rotational movement from the motors M1 and M2 to the scan hub and entrance aperture mirror, respectively.

In order to perform measurements of the near field radiation pattern of a optical source where the detector is in the far field, focusing optics, such as a lens (not shown), may be placed in the light path between the optical source and the detector in order to image the source onto the detector. For example, focusing optics may be placed at a midpoint of the light path in the mirror train embodiments described in FIGS. 3 and 4 above. Alternatively, the mirror train embodiments of either FIGS. 3 or 4 may employ mirrors with appropriately designed concave surfaces to perform the desired focusing function for near field measurements.

In accordance with another advantageous feature of the invention, active or movable mirrors may also be used to change the effective path length during scans to provide additional information on the radiation pattern of the source being measured. The active mirrors could employ solenoids, magnets or other means for moving the mirrors in or out of position as desired.

Measurement Resolution

The measurement resolution at the source depends on the geometry and the particular arrangement used for light collection (i.e., either optical light fiber or reflector train). If optical fiber is used, the resolution is determined either by the fiber diameter or by any apertures placed in front of the fiber. If a reflector train is used, the measurement resolution is determined by an aperture stop in front of the detector.

Scan Eccentricity and Angular Transformation

Figure 5:
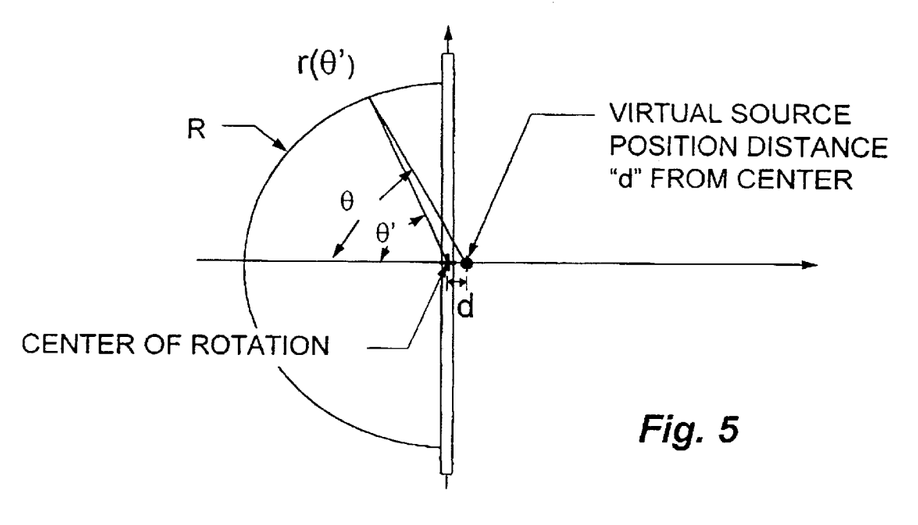
FIGS. 5 and 6 illustrate the scan eccentricity and angular transformation of the scan path relative to the optical source of the present invention.
Figure 6:
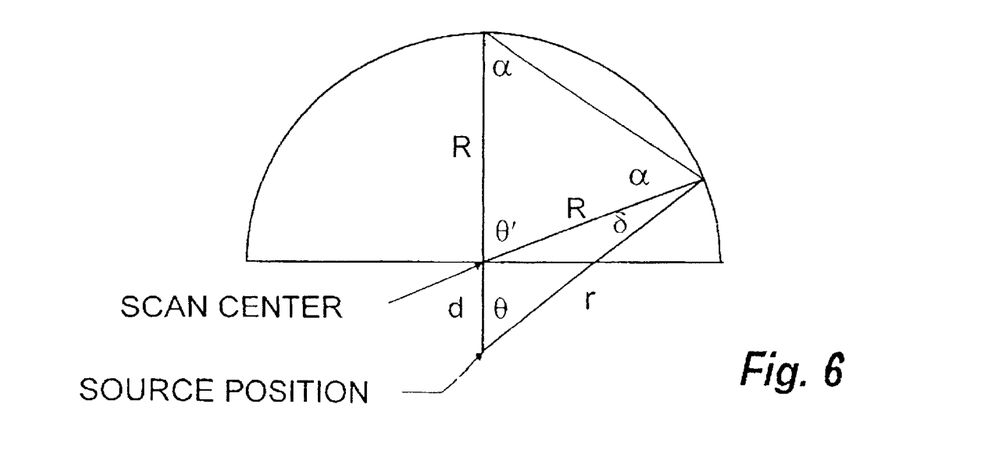

With reference now to FIG. 5, it can be seen that the scan path is slightly eccentric because the optical source is displaced slightly from the center of rotation of the entrance aperture mirror, which is also the scan path center. If the displacement distance is "d", then the virtual source is displaced "d" from the center of the scan. Data is acquired from the sensor at radius R from the mirror, and over a range of angles $\theta'$, where $-90° \leq \theta' \leq +90°$. As is seen in FIGS. 5 and 6, the distance to the source, $r(\theta')$, is always greater than the scan radius, R, in view of offset, d. Also, the angle with respect to the source, $\theta$, is less than the angle with respect to the center of scan, $\theta'$, except at $\theta'=0°$, where they are equal. To obtain the radiation pattern of the source, it is therefore necessary to correct the amplitude of the data to correct for scan eccentricity, and also to transform the angle from the scan space to the space of the source.

The distance between the source and the detector as a function of angle, $r(\theta')$, is given by the expression:

$$r(\theta') = \sqrt{R^2 + d^2 + 2Rd\cos\theta'}$$

The measured data will manifest this distance variation as an error, so that an isotropic radiation distribution would show an angular dependence, which, instead of being constant, is proportional to the inverse square of $r(\theta')$. However, this error can be entirely compensated by applying a geometric correction factor based on $r^2(\theta')$.

The angular transformation is derived from the geometry shown in FIG. 6. The transformation is given by the expression:

$$\theta = \cos^{-1}\left[\frac{d + R\cos\theta'}{\sqrt{R^2 + d^2 + 2Rd\cos\theta'}}\right]$$

Correction for Optical Collector Orientation

In general, the normal to the surface of the optical collector does not point at the source, but instead points at the scan center. This is evident from the discussion of the angular transformation above. A correction must be made to account for this change in orientation of the optical collector with respect to the source which occurs as the scan angle changes. The change in angle is the difference between the scan angle $\theta'$ and the source angle $\theta'$. The correction factor, $F(\theta')$, is the reciprocal of the cosine of the angular difference:

$$F(\theta') = \frac{1}{\cos(\theta - \theta')}$$

Polarization Effects

The s and p polarization components of the source will in general propagate differently through the optical system. These polarization effects will be present due to:
 1. reflection from the entrance aperture mirror;
 2. reflections from the reflector train components; and
 3. polarization dependent optical fiber transmission.

For the mirrors and reflectors, the magnitude of the effect is a function of the angle of incidence of the light on the reflecting surfaces, and the material properties of the reflecting surface. Polarization effects in the optical fiber depend on the fiber type.

Polarization effects will be greatest at the entrance aperture mirror, where the angle of incidence of source light will range from essentially 0°–90°. The use of silver for the mirror surface material significantly reduces this effect.

Polarization effects due to the reflector train components can be practically eliminated by coating the surfaces for equal reflection of the s and p components for the particular angle of incidence, e.g., 45° for the geometry of FIG. 3.

Polarization effects due to reflection and fiber transmission can be compensated by calibration. In addition, polarizing elements may be inserted between the source 12 and the deflection mirror 14 in order to measure specific polarizations directly.

Figure 7:
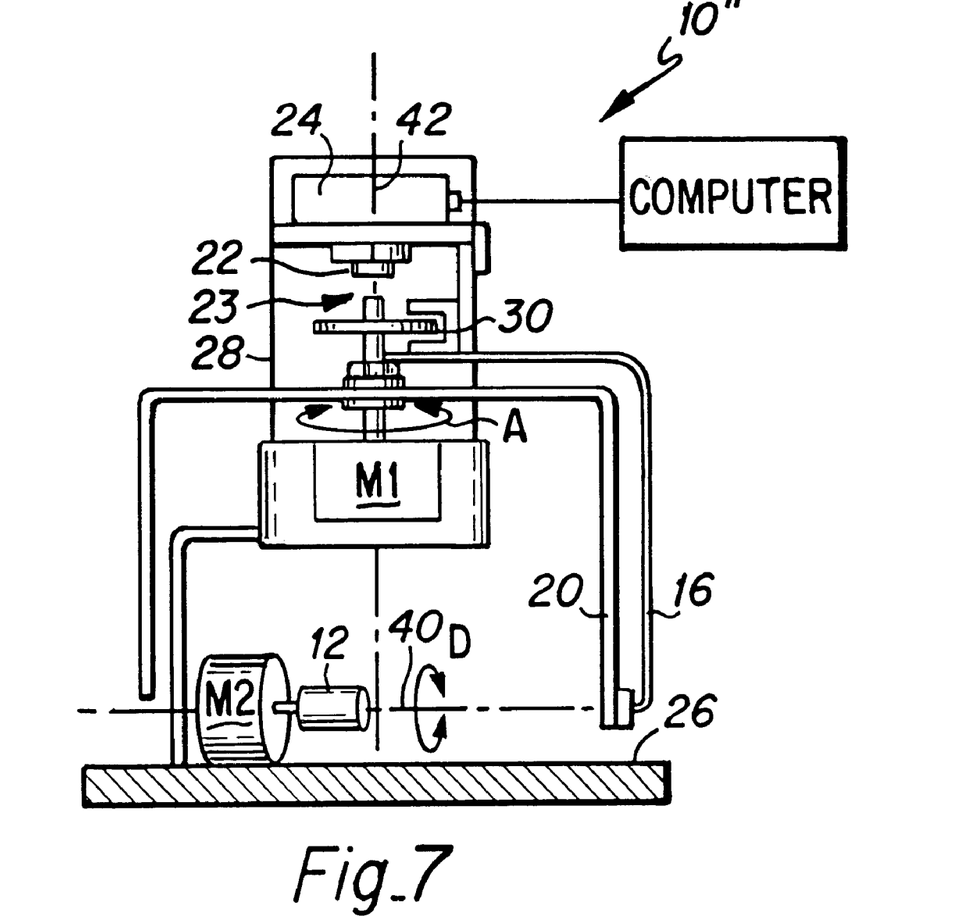
FIG. 7 is a side elevation view in partial cross section of another embodiment of the invention.

FIG. 7 shows another embodiment of the scanning radiometer 10''' of the present invention that is similar to the embodiment shown in FIGS. 1 and 2, except that this embodiment does not include deflector means 14. In this embodiment, the central axis 40 of the light source 12 is transversely oriented or orthogonal to the axis of rotation of the rotating hub 20. In operation, motor M2 rotates the optical source 12 in incremental steps about axis 40 (as indicated by directional arrow D) as the input end of optical fiber 16 (being rotated about central vertical axis 42) repeatedly scans through the light beam emanating directly from the optical source 12.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A scanning radiometer for measuring the radiation pattern of a radiating source, comprising:
   a) detector means for providing an output signal proportional to the intensity of radiation received thereby;
   b) deflector means located a distance d from a radiating source to be measured, said deflector means for directing radiation from said radiating source at a selected angle with respect to a defined axis of said radiating source;
   c) collection means for collecting radiation deflected by said deflector means;
   d) first rotating means for rotating said collection means through 360° about said radiating source such that said collection means scans through radiation deflected by said deflector means; and
   e) commutator means for commutating signals corresponding to radiation collected by said collection means as it rotates about said radiating source to said detector means.

2. A scanning radiometer according to claim 1, which further includes second rotating means for rotating said deflector means about said radiating source such that said collection means scans through a distinct angular radiation pattern for each change in position of said deflector means.

3. A scanning radiometer according to claim 2, wherein said second rotating means comprises a motor adapted for providing incremental changes in rotational movement.

4. A scanning radiometer according to claim 1, wherein:
   a) said radiating source to be measured radiates electromagnetic energy in the visible light spectrum; and
   b) said collection means comprises an optical light fiber.

5. A scanning radiometer according to claim 1, wherein:
   a) said radiating source to be measured radiates electromagnetic energy in the visible light spectrum;
   b) said first rotating means comprises a cylindrical hub having an inner cylindrical wall; and
   b) said collection means comprises a plurality of reflectors including at least a portion of which that are mounted in diametrically opposed fashion along said inner cylindrical wall of said hub so that a collected optical beam directed from said deflector is directed back and forth through the cylindrical hub from one end to the other; and
   c) said plurality of reflectors being effective to fold a path length of said collected optical beam to define an effective scan radius that is equal to the distance traversed by said optical beam as it reflects back and forth through said plurality of reflectors.

6. A scanning radiometer according to claim 5, wherein said deflector means and said plurality of reflectors are provided with a silver surface coating to reduce polarization effects.

7. A scanning radiometer for measuring the radiation pattern of a radiating source, comprising:
   a) a detector providing an output signal proportional to the intensity of radiation received thereby;
   b) a deflector located a distance d from a radiating source to be measured, said deflector for directing radiation from said radiating source at a selected angle with respect to a defined axis of said radiating source;
   c) a collector for collecting radiation deflected by said deflector;
   d) said collector mounted to a rotating hub adapted to rotate 360° about said radiating source thereby enabling said collector to scan through radiation deflected by said deflector; and
   e) a commutator for commutating signals corresponding to radiation collected by said collector while rotating about said radiating source to said detector.

8. A scanning radiometer according to claim 7, which further includes a motor for rotating said deflector about said radiating source such that said collector scans through a distinct angular radiation pattern for each change in position of said deflector.

9. A scanning radiometer according to claim 8, wherein said motor provides incremental changes in rotational movement.

10. A scanning radiometer according to claim 7, wherein:
    a) said radiating source to be measured radiates electromagnetic energy in the visible light spectrum; and
    b) said collector comprises an optical light fiber.

11. A scanning radiometer according to claim 7, wherein:
    a) said radiating source to be measured radiates electromagnetic energy in the visible light spectrum;
    b) said collector comprises a plurality of reflectors including at least a portion of which that are mounted in diametrically opposed fashion within said rotating hub so that a collected optical beam directed by said deflector is directed back and forth through said hub from one end to the other; and
    c) said plurality of reflectors effective to fold a path length of said collected optical beam to define an effective scan radius that is equal to the distance traversed by said optical beam as it reflects back and forth through said plurality of reflectors.

12. A scanning radiometer according to claim 11, wherein said deflector and said plurality of reflectors are provided with a silver surface coating to reduce polarization effects.

13. A scanning radiometer for measuring the radiation pattern of a stationary radiating light source, comprising:
    a) stationary detector means for providing an output signal proportional to the intensity of radiation received thereby;
    b) deflector means located a distance d from a radiating source to be measured, said deflector means for directing radiation from said radiating source at a selected angle with respect to a defined axis of said radiating source;
    c) first rotating means for rotating said deflector means in stepwise fashion about a central vertical axis of said radiating source;
    d) collection means for collecting radiation deflected by said deflector means;
    e) second rotating means for rotating said collection means through 360° about said radiating source such that said collection means scans through radiation deflected by said deflector means; and
    f) commutator means for commutating signals corresponding to radiation collected by said collection means as it rotates about said radiating source to said stationary detector means.

14. A scanning radiometer according to claim 13, wherein said first rotating means comprises a motor adapted to provide incremental movement.

15. A scanning radiometer according to claim 13, wherein:
   a) said radiating source to be measured radiates electromagnetic energy in the visible light spectrum; and
   b) said collection means comprises an optical light fiber.

16. A scanning radiometer according to claim 13, wherein:
   a) said radiating source to be measured radiates electromagnetic energy in the visible light spectrum; and
   b) said second rotating means comprises a cylindrical hub having an inner cylindrical wall; and
   c) said collection means comprises a plurality of reflectors including at least a portion of which that are mounted in diametrically opposed fashion along said inner cylindrical wall of said hub so that a collected optical beam directed by said deflector is directed back and forth through the cylindrical hub from one end to the other; and
   d) said plurality of reflectors effective to fold a path length of said collected optical beam to define an effective scan radius that is equal to the distance traversed by said optical beam as it reflects back and forth through said plurality of reflectors.

17. A scanning radiometer according to claim 16, wherein said deflector means and said plurality of reflectors are provided with a silver surface coating to reduce polarization effects.

18. A scanning radiometer for measuring the radiation pattern of a stationary radiating light source, comprising:
   a) a stationary detector providing an output signal proportional to the intensity of radiation received thereby;
   b) a deflector located a distance d from a radiating source to be measured, said deflector for directing radiation from said radiating source at a selected angle with respect to a central vertical axis of said radiating source;
   c) a first motor for rotating said deflector in stepwise fashion about said central vertical axis of said radiating source;
   d) a collector for collecting radiation deflected by said deflector;
   e) a second motor for rotating said collector through 360° about said radiating source such that said collector scans through radiation deflected by said deflector; and
   f) a commutator for commutating signals corresponding to radiation collected by said collector as it rotates about said radiating source to said stationary detector.

19. A scanning radiometer according to claim 18, wherein said first motor is adapted to provide incremental changes in movement.

20. A scanning radiometer according to claim 18, wherein:
   a) said radiating source to be measured radiates electromagnetic energy in the visible light spectrum; and
   b) said collector comprises an optical light fiber.

21. A scanning radiometer according to claim 18, wherein:
   a) said radiating source to be measured radiates electromagnetic energy in the visible light spectrum;
   b) said collector comprises a hub and a plurality of reflectors including at least a portion of which that are mounted in diametrically opposed fashion within said hub so that a collected optical beam directed from said deflector is directed back and forth through said hub from one end to the other; and
   c) said plurality of reflectors effective to fold a path length of said collected optical beam to define an effective scan radius that is equal to the distance traversed by said optical beam as it reflects back and forth through said plurality of reflectors.

22. A scanning radiometer according to claim 21, wherein said deflector and said plurality of reflectors are provided with a silver surface coating to reduce polarization effects.

23. A method for measuring the radiation pattern of a stationary radiating source, comprising the steps of:
   a) deflecting radiation from a stationary radiating source using a deflector to direct radiation from said radiating source at a selected angle with respect to a defined axis of the radiating source;
   b) scanning through the deflected radiation by continuously rotating a radiation collector through 360° about the radiating source so that the radiation collector intercepts a path of the deflected radiation at least once for each 360° rotation; and
   c) commutating a signal corresponding to the radiation collected by the rotating radiation collector to a stationary detector.

24. The method according to claim 23, which includes the step of rotating the deflector in step increments about the defined axis of the radiating source so that the collector scans through a distinct angular radiation pattern for each change in position of the deflector.

25. The method according to claim 24, wherein:
   a) the radiating source to be measured radiates electromagnetic energy in the visible light spectrum;
   b) the collector comprises a plurality of reflectors including at least a portion of which that are mounted in diametrically opposed fashion within rotating hub so that a collected optical beam directed from the deflector is directed back and forth through the hub from one end to the other; and
   c) the plurality of reflectors are effective to fold a path length of said collected optical beam to define an effective scan radius that is equal to the distance traversed by the optical beam as it reflects back and forth through the plurality of reflectors.

26. The method according to claim 25, which includes the step of interposing focusing optics in the optical path between the radiating source and the detector in order to image the radiation source onto the detector for measurement of the near field radiation pattern of the radiating source.

27. A scanning radiometer for measuring the radiation pattern of a radiating source, comprising:
   a) detector means for providing an output signal proportional to the intensity of radiation received thereby;
   b) first rotating means for rotating a radiating source in step increments about central axis of said radiating source;
   c) collection means for collecting radiation from said radiating source;
   d) second rotating means for rotating said collection means through 360° about said radiating source and about an axis orthogonal to said central axis of said radiating source such that said collection means scans through radiation from said radiating source at least once for each 360° rotation; and e) commutator means for commutating signals corresponding to radiation collected by said collection means as it rotates about said radiating source to said detector means.

28. A scanning radiometer according to claim 27, wherein:

a) said radiating source to be measured radiates electromagnetic energy in the visible light spectrum; and b) said collection means comprises an optical light fiber.

* * * * *